(12) United States Patent
Wiatrowski et al.

(10) Patent No.: US 8,279,991 B2
(45) Date of Patent: Oct. 2, 2012

(54) METHOD OF EFFICIENTLY SYNCHRONIZING TO A DESIRED TIMESLOT IN A TIME DIVISION MULTIPLE ACCESS COMMUNICATION SYSTEM

(75) Inventors: David G. Wiatrowski, Woodstock, IL (US); Dipendra M. Chowdhary, Hoffman Estates, IL (US); Thomas B. Bohn, McHenry, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 705 days.

(21) Appl. No.: 12/331,189

(22) Filed: Dec. 9, 2008

(65) Prior Publication Data

US 2010/0086092 A1    Apr. 8, 2010

Related U.S. Application Data

(60) Provisional application No. 61/102,770, filed on Oct. 3, 2008.

(51) Int. Cl.
*H04L 7/04* (2006.01)
(52) U.S. Cl. ........ 375/362; 370/321; 370/337; 370/347; 370/442; 714/707; 714/731; 714/744; 714/775; 714/789
(58) Field of Classification Search ................. None
See application file for complete search history.

(56) References Cited

U.S. PATENT DOCUMENTS

| | | | |
|---|---|---|---|
| 4,698,805 A | 10/1987 | Sasuta et al. | |
| 5,020,130 A | 5/1991 | Grube et al. | |
| 5,179,720 A | 1/1993 | Grube et al. | |
| 5,287,551 A | 2/1994 | Gustafson, Jr. et al. | |
| 5,329,558 A | 7/1994 | Larsson et al. | |
| 5,519,710 A | 5/1996 | Otsuka | |
| 5,724,515 A | 3/1998 | Barnes et al. | |
| 5,734,643 A | 3/1998 | Rondeau | |
| 5,761,211 A * | 6/1998 | Yamaguchi et al. | 714/707 |
| 5,774,786 A | 6/1998 | Wirtjes et al. | |
| 5,905,965 A | 5/1999 | Asano et al. | |
| 6,052,557 A | 4/2000 | Kinnunen et al. | |

(Continued)

FOREIGN PATENT DOCUMENTS

EP    0886451 A1    12/1998

(Continued)

OTHER PUBLICATIONS

Ahmed Sobeih, et al. "Almost Peer-To-Peer Clock Synchronization", University of Illinois-IBM TJ Watson Research Center; IEEE 2007; 10 Pages.

(Continued)

*Primary Examiner* — David C. Payne
*Assistant Examiner* — Adolf Dsouza
(74) *Attorney, Agent, or Firm* — Terri Hughes Smith; Daniel R. Bestor

(57) ABSTRACT

In operation, a transmitting device selects a synchronization pattern associated with the desired timeslot that is at least mutually exclusive from synchronization patterns associated with other timeslots on the same frequency in the system. Once selected, the transmitting device transmits a burst embedding the synchronization pattern that was selected, where appropriate. If the receiving device detects the synchronization pattern, it immediately synchronizes with the timeslot with confidence that it is synchronizing to the desired timeslot by using sets of synchronization patterns associated with the desired timeslot that are at least mutually exclusive from synchronization patterns associated with the other timeslots on the same frequency.

21 Claims, 9 Drawing Sheets

U.S. PATENT DOCUMENTS

| | | | |
|---|---|---|---|
| 6,052,562 | A | 4/2000 | Dorenbosch |
| 6,097,928 | A | 8/2000 | Jeon |
| 6,144,656 | A | 11/2000 | Kinnunen et al. |
| 6,411,614 | B1 | 6/2002 | Weigand |
| 7,050,419 | B2 * | 5/2006 | Azenkot et al. ............... 370/347 |
| 7,203,207 | B2 | 4/2007 | Hiben |
| 7,499,441 | B2 | 3/2009 | Wiatrowski et al. |
| 8,045,499 | B2 | 10/2011 | Waitrowski et al. |
| 2002/0173311 | A1 | 11/2002 | Biggs et al. |
| 2003/0058925 | A1 | 3/2003 | Jechoux et al. |
| 2003/0076842 | A1 | 4/2003 | Johansson et al. |
| 2003/0153319 | A1 | 8/2003 | Wieczorek et al. |
| 2004/0196872 | A1 | 10/2004 | Nakamura |
| 2005/0068928 | A1 | 3/2005 | Smith et al. |
| 2005/0070320 | A1 | 3/2005 | Dent |
| 2005/0153666 | A1 | 7/2005 | Nguy et al. |
| 2005/0153723 | A1 | 7/2005 | Hosur et al. |
| 2005/0174963 | A1 | 8/2005 | Hsu |
| 2005/0277383 | A1 | 12/2005 | Reid |
| 2006/0041680 | A1 | 2/2006 | Proctor, Jr. et al. |
| 2006/0198346 | A1 | 9/2006 | Liu et al. |
| 2006/0221887 | A1 | 10/2006 | Newberg et al. |
| 2006/0234748 | A1 | 10/2006 | Baik |
| 2006/0245454 | A1 | 11/2006 | Balasubramanian et al. |
| 2007/0104139 | A1 | 5/2007 | Marinier et al. |
| 2007/0129079 | A1 | 6/2007 | Schwarz et al. |
| 2007/0275756 | A1 | 11/2007 | Choi |
| 2008/0008153 | A1 | 1/2008 | Hiben et al. |
| 2008/0219191 | A1 | 9/2008 | Wang et al. |
| 2008/0225821 | A1 | 9/2008 | Faith |
| 2008/0232344 | A1 | 9/2008 | Basu et al. |
| 2009/0016283 | A1 | 1/2009 | Zhang et al. |
| 2009/0034432 | A1 | 2/2009 | Bonta et al. |
| 2009/0219916 | A1 | 9/2009 | Bohn |
| 2010/0086092 | A1 | 4/2010 | Wiatrowski et al. |
| 2010/0303033 | A1 | 12/2010 | Shahar et al. |
| 2011/0026514 | A1 | 2/2011 | Tay |
| 2011/0216746 | A1 | 9/2011 | Tay |

FOREIGN PATENT DOCUMENTS

| | | |
|---|---|---|
| EP | 0991216 A2 | 4/2000 |
| GB | 2271690 A | 4/1994 |
| KR | 10-0349664 B1 | 8/2002 |
| KR | 10-2008-0021454 A | 3/2008 |
| WO | 2005107098 A1 | 11/2005 |
| WO | 2006087265 A1 | 8/2006 |

OTHER PUBLICATIONS

PCT International Search Report Dated Mar. 3, 2011 for Related U.S. Appl. No. 12/760,787.

PCT Preliminary Report on Patentability Dated Apr. 14, 2011.

Choon Geun Cho, "Corresponding Application PCT/US2009/058326—PCT International Search Report and Written Opinion," WIPO, ISA/KR, Korean Intellectual Property Office, Daejeon, Republic of Korea, May 10, 2010, 10 pages, most relevant pp. 6-7 and 10.

Sang Hyun Park, Corresponding Application PCT/US2009/058545—PCT International Search Report and Written Opinion, WIPO, ISA/KR, Korean Intellectual Property Office, Daejeon, Republic of Korea, Apr. 30, 2010, 11 pages, most relevant pp. 6-7 and 10-11. For related U.S. Appl. No. 12/331,180.

Jung Pil Seung, "Corresponding Application PCT/US2009/058550—PCT International Search Report and Written Opinion," WIPO, ISA/KR, Korean Intellectual Property Office, Daejeon, Republic of Korea, Apr. 30, 2010, 10 pages, most relevant pp. 6-7 and 10. For related U.S. Appl. 12/331,167.

PCT International Search Report Dated Apr. 15, 2010 for Related U.S. Appl. No. 12/331,137.

"Electromagnetic Compatibility and Radio Spectrum Matters (ERM); Digital Mobile Radio (DMR) Systems; Part 1 : DMR Air Interface (A1) Protocol," ETSI TS 102 361-1, V1.4.5, Dec. 2007-2012.

Ex Parte Quale Office Action mailed on Jun. 24, 2011, in United States, related U.S. Appl. No. 12/331,137, David G. Wiatrowski, filed on Dec. 9, 2008.

International Preliminary Report on Patentability for related International Application No. PCT/US2009/058545 mailed on Apr. 14, 2011.

International Preliminary Report on Patentability for related International Application No. PCT/US2009/058548 mailed on Apr. 14, 2011.

International Preliminary Report on Patentability for related International Application No. PCT/US2009/058550 mailed on Apr. 14, 2011.

International Search Report and Written Opinion for related International Application No. PCT/US2011/29700 mailed on Nov. 25, 2011.

Non Final Office Action mailed on Apr. 22, 2011, in United States, related U.S. Appl. No. 12/331,155, Tejal S. Patel, filed Dec. 9, 2008.

Non Final Office Action mailed on Dec. 28, 2011, in United States, related U.S. Appl. No. 12/331,167, Satish R. Panpaliya, filed Dec. 9, 2008.

Non Final Office Action mailed on May 27, 2011, in United States, related U.S. Appl. No. 12/331,180, Dipendra M. Chowdhary, filed Dec. 9, 2008.

Notice of Allowance mailed on Aug. 8, 2011, in United States, related U.S. Appl. No. 12/331,137, David G. Wiatrowski, filed Dec. 9, 2008.

Notice of Allowance mailed on Dec. 14, 2011, in United States, related U.S. Appl. No. 12/331,155, Tejal S. Patel, filed Dec. 9, 2008.

Notice of Allowance mailed on Nov. 7, 2011, in United States, related U.S. Appl. No. 12/331,180, Dipendra M. Chowdhary, filed Dec. 9, 2008.

Supplementary European Search Report for European Application No. 09 81 8328, European Patent Office, The Hague, Netherlands, mailed on Mar. 6, 2012.

Supplementary European Search Report for European Application No. 09818326, European Patent Office, The Hague, Netherlands, mailed on Feb. 27, 2012.

Office Action Dated Apr. 20, 2012 for Related U.S. Appl. No. 12/761,023.

Office Action Dated May 11, 2012 for Related U.S. Appl. No. 12/760,787.

European Extended Search Report dated Mar. 1, 2012 for related Application PCT/US2009/058545.

* cited by examiner

METHOD OF EFFICIENTLY SYNCHRONIZING TO A DESIRED TIMESLOT IN A TIME DIVISION MULTIPLE ACCESS COMMUNICATION SYSTEM

CROSS-REFERENCE TO RELATED APPLICATIONS

This application is commonly owned by Motorola, Inc. and concurrently filed with the following U.S. Patent applications:

Ser. No. 12/331,180, titled "Method for Trunking Radio Frequency Resources," which is incorporated herein by reference in its entirety;

Ser. No. 12/331,167, titled "Method for Selecting a Channel to be Monitored by Subscriber Units that are Idle in a Communication System," which is incorporated herein by reference in its entirety;

Ser. No. 12/331,137, titled "Method of Communicating which Channel is to be Monitored by Subscriber Units that are Idle in a Communication System," which is incorporated herein by reference in its entirety; and Ser. No. 12/331,155, titled "Method for Ending a Call Session in a Communications System," which is incorporated herein by reference in its entirety.

FIELD OF THE DISCLOSURE

The present disclosure relates generally to two-way wireless communication systems, and more particularly to timeslot synchronization on a time division multiple access (TDMA) communication system.

BACKGROUND OF THE DISCLOSURE

The European Telecommunications Standard Institute—Digital Mobile Radio (ETSI-DMR) standard (ETSI TS 102 361-1) describes a TDMA air interface protocol. Before a subscriber unit is allowed to receive or transmit on a TDMA channel, it must ensure that it is synchronized with the desired timeslot. To that end, the ETSI-DMR standard provides a TDMA Channel (TC) bit which informs the receiving device whether the next timeslot to be received is timeslot 1 or timeslot 2. The TC bit, along with other protocol bits that are of no particular importance relative to this disclosure, is protected with forward error correction (FEC) parity bits (e.g., using a Hamming (7,4) code) to improve the probability that it is received correctly in the presence of unavoidable channel impairments; the protocol, however, does not provide any error detection parity bits (e.g., cyclic redundancy check or checksum) which may enable the receiving device to determine whether the TC bit has been received correctly. Consequently, inspecting a single TC bit provides the receiving device an indication of which timeslot follows, but with limited confidence that the timeslot has been identified correctly.

Inspecting multiple adjacent TC bits and noting whether they alternately indicate timeslot 1 and timeslot 2 can provide the receiving device insight as to the correct, incorrect, or uncertain identification of the timeslots, but inspecting multiple TC bits requires additional time because they are only provided on the channel periodically (e.g., every 30 ms). A receiving device may need to receive 4 to 8 adjacent TC bits (correspondingly, 120 to 240 ms after synchronizing with the frequency) to identify a timeslot as being timeslot 1 or timeslot 2 with high confidence, and possibly need to receive more TC bits if errors in the alternating timeslot 1—timeslot 2 pattern are noted. This amount of time can be restrictive and limit performance in systems that require the receiving device to change channels frequently. An example of such a system is one that requires the receiving device to search for call activity of interest by sequentially stepping through, or scanning, a list of channels.

According to the ETSI-DMR standard, the TC bits are transmitted in the Common Announcement Channel (CACH). The CACH is transmitted by a repeater, and is positioned between the transmission of timeslot 1 and timeslot 2. The ETSI-DMR standard also provides for direct mode (or talk-around) transmissions, where subscriber units may communicate without the facilitation of the repeater; the ETSI-DMR standard, however, only allows up to one subscriber unit to transmit in direct mode on a frequency at a time, which leaves a significant portion of the channel unoccupied. Since there is no repeater in direct mode transmissions, there is no CACH message to identify timeslots on the channel. The transmitting subscriber unit cannot provide the CACH information, because a 2.5 ms "guard time" between the two timeslots must be reserved to ensure two transmitting subscriber units do not interfere with one another due to factors such as propagation delays and drift of the reference oscillator.

BRIEF DESCRIPTION OF THE FIGURES

The accompanying figures serve to further illustrate various embodiments and to explain various principles and advantages, all in accordance with the present disclosure.

Figure 1:
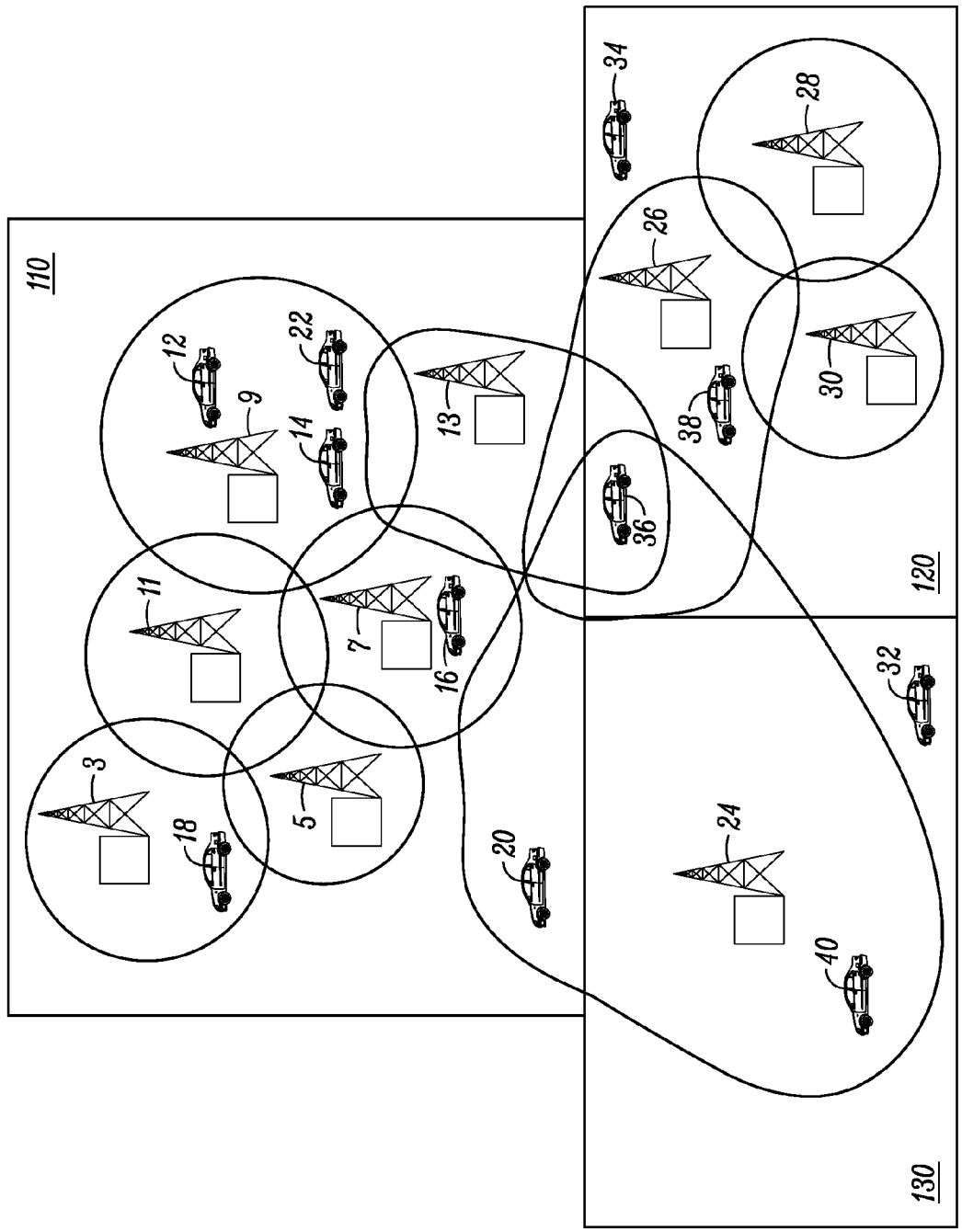
FIG. 1 illustrates a block diagram of an exemplary wireless communications landscape in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

The present disclosure discloses a method for efficiently synchronizing to a desired timeslot in a TDMA communication system. In repeater-based transmissions, the present disclosure reduces the time required for the receiving device to synchronize to the desired timeslot, thus eliminating the extra time needed to reliably decode the TC bits in the CACH message, as described above in the background. In a repeater-based transmission, a transmitting device selects a synchronization pattern associated with the desired timeslot (i.e., the timeslot in which it is to transmit in) that is mutually exclusive from synchronization patterns associated with the other timeslots on the same frequency in the system, and in some embodiments, mutually exclusive from synchronization patterns associated with other timeslots across multiple frequencies in the TDMA system. Once selected, the transmitting device transmits a burst embedding the synchronization pattern that was selected, where appropriate. If the receiving device detects the synchronization pattern, the receiving device immediately synchronizes with the timeslot with confidence that it is synchronizing to the desired timeslot, or can immediately adjust its timing in order to decode the desired timeslot, without needing extra time to reliably decode the TC bits in the CACH.

It should be noted that the number of bits used may determine the level of confidence that the receiving device has synchronized to the desired timeslot. For example, let's assume that a synchronization pattern comprises a 48-bit sequence of bits and the synchronization patterns used in one timeslot are mutually exclusive from the synchronization patterns used in other timeslots. In other words, the probability of an incorrect timeslot identification based on a 48-bit synchronization word is much less than the probability of an incorrect timeslot identification based on a decoded Hamming (7,4) code. It should also be noted that the level of confidence that the receiving device has synchronized to the desired timeslot also increases when the mutually exclusive synchronization patterns are different by an increasing number of bits to allow for channel errors not to effect the identification of the desired timeslot. Obviously, the number of bits used in the synchronization pattern and the number of different bits between the mutually exclusive synchronization patterns is a matter of system design choice, and should no way limit the spirit and scope of the present invention.

In direct-mode transmissions, the present disclosure improves spectral efficiency by using synchronization patterns associated with the timeslots on a frequency in the TDMA system that are mutually exclusive of each other in order to identify the timeslots. In direct-mode transmissions, a transmitting subscriber unit selects a synchronization pattern associated with the desired timeslot that is mutually exclusive from synchronization patterns associated with the other timeslots on the same frequency in the system, and in some embodiments, mutually exclusive from synchronization patterns associated with other timeslots across multiple frequencies in the TDMA system. As a result, more than one subscriber unit may transmit in direct mode on a frequency at the same time without interfering with other transmissions on the frequency, thus utilizing the entire channel bandwidth. For example, in a TDMA communication system having a 2:1 slotting structure, if two direct-mode transmissions are transmitted simultaneously on a 12.5 kHz RF channel bandwidth in separate timeslots using synchronization patterns for their respective timeslots that are mutually exclusive, then 6.25e spectral efficiency (i.e., two users are simultaneously using 12.5 kHz RF channel bandwidth) is achieved. The receiving subscriber unit, in the direct-mode transmission, is searching for a synchronization pattern associated with its desired timeslot. If the receiving subscriber unit detects the synchronization pattern, the receiving subscriber unit immediately synchronizes to the timeslot with confidence that it is synchronizing to the desired timeslot. Let us now turn to the figures, and describe the present disclosure in greater detail.

Referring now to FIG. 1, there is shown an example of a wireless communications landscape 100 having system 110, system 120, and system 130, whereby a system comprises a multiplicity of communication resources of radio frequencies, repeaters (also known as base stations) and subscriber units (also known as mobile stations, or the like) optionally managed by system controllers (not shown). The subscriber units send/receive communications to/from the repeaters. In one embodiment, one system controller (not shown) may be associated with a repeater, e.g., repeater 24, or one system controller (not shown) may be associated with each system, e.g., system 110. In either case, the system controller manages the operation of the system, e.g., system 110.

In another embodiment, the system (e.g., system 110) does not contain a system controller and the subscriber units are required to cooperatively operate on the system. System 110 comprises a plurality of cells, each with a repeater 3, 5, 7, 9, 11, 13 typically located at the center of the cell, and a plurality of subscriber units 12, 14, 16, 18, 20, 22, all of which are communicating on radio frequencies assigned to system 110. The subscriber units 12, 14, 16, 18, 20, 22 in system 110 operate on all the radio frequencies associated with the repeaters 3, 5, 7, 9, 11, 13 in system 110. System 120 comprises a plurality of cells, each with a repeater 26, 28, 30 typically located at the center of the cell, and a plurality of subscriber units 34, 36, 38, all of which are communicating on radio frequencies assigned to system 120. The subscriber units 34, 36, 38 of system 120 may include all the radio frequencies associated with repeaters 26, 28, 30. Further, subscriber unit 36 may operate on all radio frequencies associated with the repeaters in system 110, system 120 and system 130 since the subscriber unit 36 is sufficiently close to all three systems 110, 120, 130. System 130 comprises a cell with a repeater 24 and subscriber units 32, 40 all of which are communicating on radio frequencies assigned to system 130.

In yet another embodiment, subscriber units 12, 22, for example, in close proximity to each other may communicate with each other on direct-mode radio frequencies without communicating through a repeater. The subscriber units 12, 22 operate on all direct mode radio frequencies.

A repeater preferably comprises fixed equipment for communicating data/control and voice information to and from the subscriber units for facilitating communications between the subscriber units in the wireless communications landscape 100. A subscriber unit preferably comprises mobile or portable devices (such as an in-car or handheld radios or radio telephones) capable of communicating with a repeater or another subscriber unit using TDMA techniques as further described herein, in which specified time segments are divided into assigned timeslots for individual communications. As is known in the art, each radio frequency in the system carries timeslots whereby each timeslot is known as a "channel."

For ease of describing the embodiments of the present disclosure, the wireless communications landscape 100 assumes that each system is a two slot TDMA communications system unless otherwise noted; thus, in the embodiments described below, since there are two timeslots, there are two channels available on each radio frequency for carrying the traffic of the system. It is important to note, however, that the TDMA communication system may have other slotting ratios, as well, and still remain within the spirit and scope of the present disclosure. Thus, the present disclosure is applicable to any TDMA communication system that has a slotting ratio that is n:1, where n is an integer greater than 1.

Figure 2:
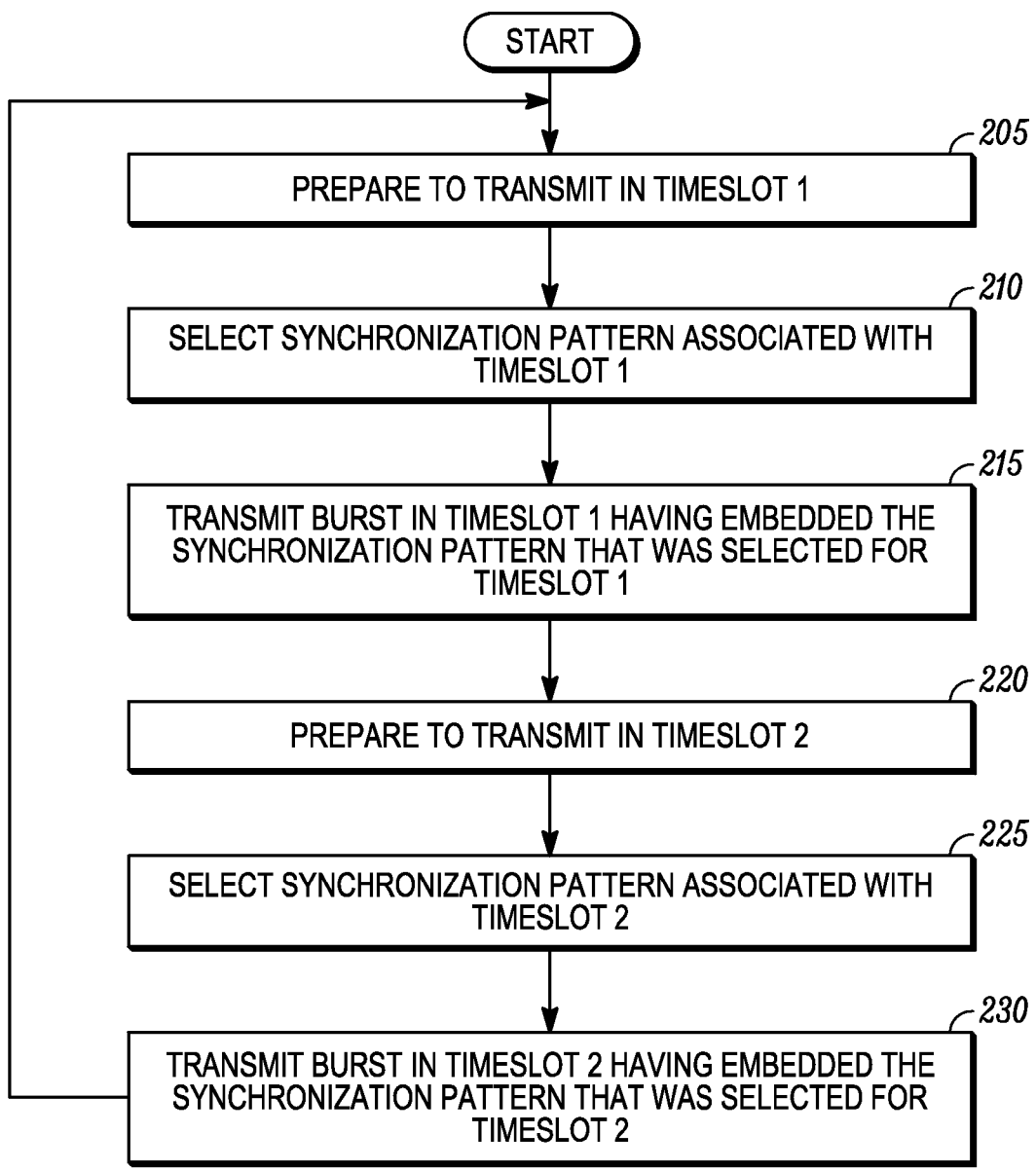
FIG. 2 illustrates a flow diagram of an exemplary method of how a transmitting device transmits bursts in Timeslot 1 and Timeslot 2 using different synchronization patterns associated with the timeslots in accordance with an embodiment of the present disclosure.

Let us start the discussion from the perspective of the transmitting device by referring to FIG. 2. FIG. 2 illustrates how the transmitting device transmits bursts in Timeslot 1 and Timeslot 2 embedding different synchronization patterns associated with the different timeslots such that the receiving device is able to efficiently synchronize to the desired timeslot in accordance with the present disclosure. In operation, the transmitting device knows a set of synchronization patterns associated with each timeslot on a frequency, and in this embodiment, each set of synchronization patterns associated with each timeslot on the frequency are mutually exclusive of each other, meaning that a synchronization pattern that is in one set cannot be in another set. Also, in some embodiments, the synchronization patterns within a set can also be mutually exclusive from each other. The transmitting device prepares to transmit in Timeslot 1 (e.g., if the transmitting device is a repeater, the repeater may, for example, set the TC bit in the CACH to "0", which indicates that the next timeslot is Timeslot 1 in accordance with the ETSI-DMR standard; or the repeater may simply form the burst to be transmitted, or the like, by applying error detection parity bits to the payload, applying forward error correction parity bits to the payload, adding embedded control signaling, or performing interleaving) (at step 205). Once prepared to transmit in Timeslot 1, the transmitting device selects a synchronization pattern from the set of synchronization patterns associated with Timeslot 1 (at step 210).

Depending on the system design, the set of synchronization patterns associated with a timeslot may comprise only one synchronization pattern (e.g., Sync_TS1 or Sync_TS2) or may comprise a plurality of synchronization patterns that differentiate, for example, between the source of the transmission and/or payload-type. For example, let us assume that the sets of synchronization patterns in this example comprise a plurality of synchronization patterns that differentiate between source and payload-type. Thus, once prepared to transmit in Timeslot 1, the transmitting device selects the synchronization pattern (at step 210) by determining the payload-type (e.g., voice, data, or control) of Timeslot 1. Thus, in this example, if the payload-type of Timeslot 1 is data or control, the transmitting device selects a data synchronization pattern from a set of synchronization patterns associated with Timeslot 1 (e.g., BS_Sourced_Data_TS1=DFF57D75DF5D$_{16}$) If, however, the payload-type of Timeslot 1 is voice, the transmitting device selects a voice synchronization pattern from a set of synchronization patterns associated with Timeslot 1 (e.g., BS_Sourced_Voice_TS1=755FD7DF75F7$_{16}$).

Once a synchronization pattern associated with Timeslot 1 is selected, the transmitting device transmits the burst having embedded the synchronization pattern associated with Timeslot 1 that was selected, where appropriate, and other information that is of no particular importance relative to this disclosure (at step 215). It should be noted that it is not always appropriate to embed a synchronization pattern in the burst being transmitted by the transmitting device. For example, if Timeslot 1 is carrying a voice transmission, the voice synchronization pattern associated with Timeslot 1 is only embedded in every sixth burst of the transmission in accordance with the ETSI DMR TS 102 361-1 superframe rules.

Once the transmitting device transmits the burst in Timeslot 1 at step 215, the transmitting device prepares to transmit in Timeslot 2 (e.g., if the transmitting device is a repeater, the repeater may, for example, set the TC bit in the CACH to "1", which indicates that the next timeslot is Timeslot 2 in accordance with the ETSI-DMR standard; or the repeater may simply form the burst to be transmitted, or the like, by applying error detection parity bits to the payload, applying forward error correction parity bits to the payload, adding embedded control signaling, or performing interleaving) (at step 220). Once prepared to transmit in Timeslot 2, the transmitting device selects a synchronization pattern from the set of synchronization patterns associated with Timeslot 2 (at step 225). To use the example above, the transmitting device selects the set of synchronization patterns associated with Timeslot 2 (at step 225) by determining the payload-type of Timeslot 2. Thus, in this example, if the payload-type of Timeslot 2 is data or control, the transmitting device selects a data synchronization pattern associated with Timeslot 2 (e.g., BS_Sourced_Data_TS2 =DD7FF5D757DD$_{16}$). If, however, the payload-type of Timeslot 2 is voice, the transmitting device selects a voice synchronization pattern associated with Timeslot 2 (e.g., BS_Sourced_Voice_TS2=77D55F7DFD77$_{16}$). Once the appropriate synchronization pattern for Timeslot 2 is selected, the transmitting device transmits the burst having embedded the synchronization pattern associated with Timeslot 2 that was selected, where appropriate, and other information that is of no particular importance relative to this disclosure (at step 230).

It is important to note that the sets of synchronization patterns referenced throughout the disclosure can be a set of one or greater. For example, the synchronization patterns in a set may not differentiate between a data/control and voice, as described in the example above with FIG. 2. Many of the examples describe the sets of synchronization patterns having a separate synchronization pattern for voice bursts and data/control burst, and/or having separate synchronization patterns for voice bursts sourced from a repeater and voice bursts sourced from a subscriber unit, and/or having separate synchronization patterns for data burst sourced from a repeater and data burst sourced from a subscriber unit, etc. Thus, the synchronization patterns in a set that are associated with a timeslot may have one synchronization pattern associated with the timeslot that does not differentiate between source and/or payload-type, or may have a plurality of synchronization patterns that differentiate between data, control and/or voice, or may have a plurality of synchronization patterns that differentiate between the sources of the burst (e.g., bursts being transmitted from a repeater versus bursts being transmitted from a subscriber unit), and/or the like. These examples described throughout the disclosure should not be construed as limiting the scope of the disclosure.

Figure 3:
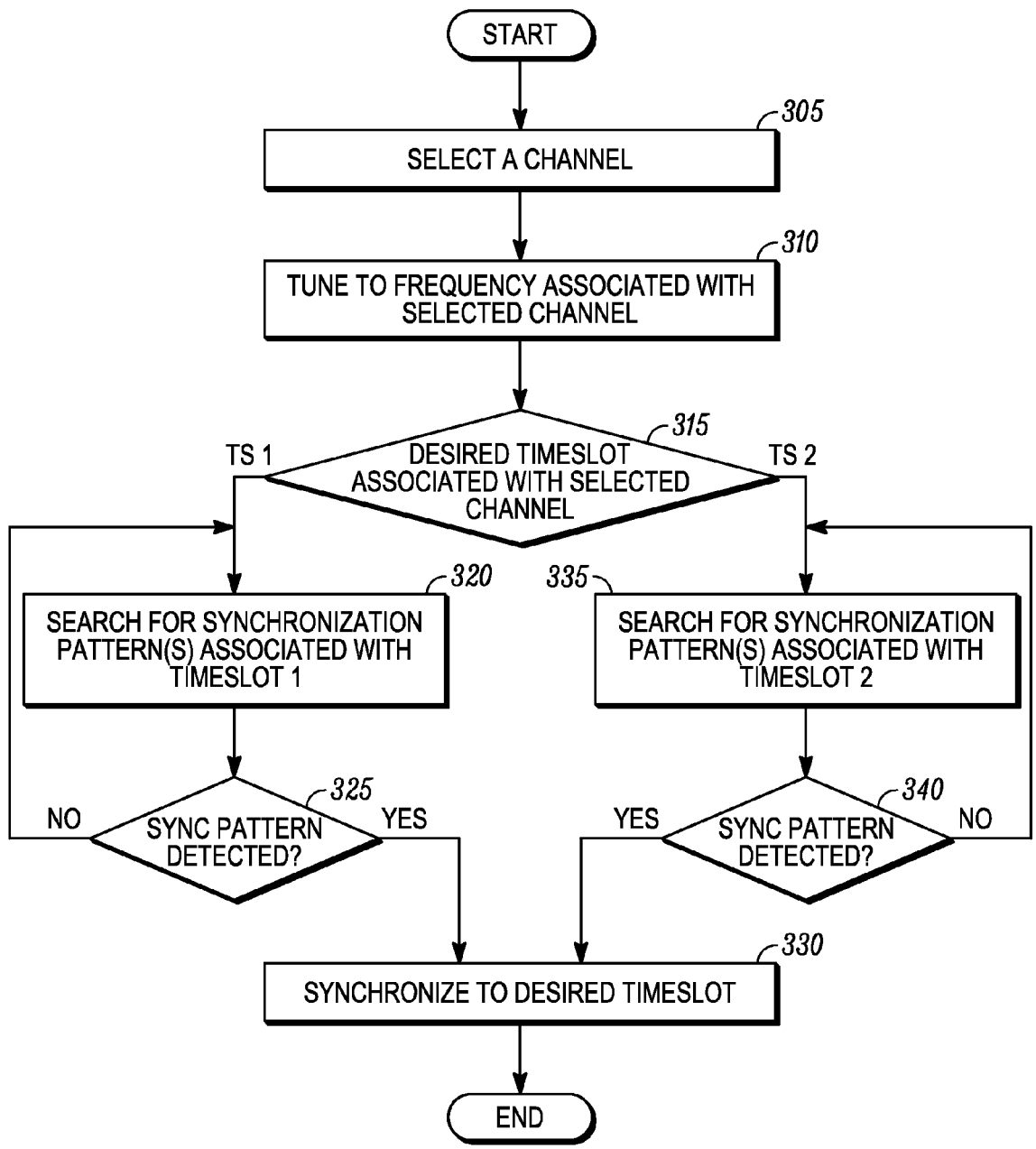
FIG. 3 illustrates a flow diagram of a first exemplary method of how a receiving device efficiently synchronizes to the desired timeslot in accordance with an embodiment of the present disclosure.

Let us now move the discussion to the perspective of the receiving device by referring to FIG. 3. FIG. 3 illustrates one embodiment of how the receiving device efficiently synchronizes to the desired timeslot in the TDMA communication system. In operation, a channel is selected for the receiving device (at step 305). The selected channel comprises attributes of a desired frequency and a desired timeslot. The channel selection for the receiving device could occur in one of several ways, for example, but not limited to, the following: (1) where a user of the receiving device selects the channel via a channel selector switch; (2) where a user of the receiving device activates the scan feature and the receiving device sequentially selects channels from a scan list; (3) where a system resource allocator instructs the receiving device, over-the-air, which channel to use (e.g., via a channel grant message, a system channel status message, or the like); or (4) where the transmitting device informs the receiving device which timeslot is currently a rest timeslot (or channel) or which timeslot (or channel) has call activity that may be of interest (e.g., a system channel status message). The concept of the rest timeslot (or rest channel) is disclosed in U.S. Ser. No. 12/331,180, titled "Method for Trunking Radio Frequency Resources" and developed by and assigned to Motorola, Inc., which is herein incorporated by reference in its entirety.

Once the channel selection for the receiving device is determined, the receiving device tunes to the desired frequency associated with the selected channel (at step 310), and begins searching for the synchronization pattern(s) associated with the desired timeslot (at steps 315 and 320 or 315 and 335). For example, if the channel selection for the receiving device has Timeslot 1 as one of its attributes, then the receiving device searches for synchronization patterns that the transmitting device associates with Timeslot 1 (e.g., the set of synchronization patterns associated with Timeslot 1 may include at least one of BS_Sourced_Data_TS1, BS_Sourced_Voice_TS1, SU_Sourced_Data_TS1, SU_Sourced_Voice_TS1, or Sync_Pattern_TS1). If, however, the channel selection for the receiving device has Timeslot 2 as one of its attributes, then the receiving device searches for synchronization patterns that the transmitting device associates with Timeslot 2 (e.g., the set of synchronization patterns associated with Timeslot 2 may include at least one of BS_Sourced_Data_TS2, BS_Sourced_Voice_TS2, SU_Sourced_Data_TS2, SU_Sourced_Voice_TS2 or Sync_Pattern_TS2). It is important to note that the set of synchronization patterns associated with the desired timeslot is mutually exclusive of the sets of synchronization patterns associated with any of the other timeslots on the desired frequency. Depending on system configuration, there may be other embodiments where each set of synchronization patterns on a frequency may be mutually exclusive of each other; in yet other embodiments, each set of synchronization patterns in the TDMA system may be mutually exclusive of each other.

Thus, if the desired timeslot in the channel selection is Timeslot 1, the receiving device searches for synchronization patterns associated with Timeslot 1 (at step 320). The receiving device searches the desired frequency for the synchronization patterns until it detects one of the synchronization patterns associated with Timeslot 1 (at step 325). It is important to note that when the receiving device detects one of the synchronization patterns associated with Timeslot 1 on the desired frequency, the receiving device immediately synchronizes to the timeslot in which the synchronization pattern was detected with confidence that it is synchronizing to the desired timeslot. The receiving device then decodes the bursts according to known techniques (at step 330). As a result, the need for additional processing to reliably decode the TC bits in the CACH is eliminated and the risk of the subscriber unit synchronizing to the incorrect timeslot due to TC bit corruption is eliminated, thus resulting in a net time savings and much higher confidence that the receiving device has synchronized to the desired timeslot.

Returning back to step 315, if the desired timeslot in the channel selection is Timeslot 2, the receiving device searches for synchronization patterns associated with Timeslot 2 (at step 335). The receiving device searches the desired frequency for the synchronization patterns until it detects one of the synchronization patterns associated with Timeslot 2 (at step 340). Again, it is important to note that once the receiving device detects one of the synchronization patterns associated with Timeslot 2 on the frequency (at step 340), the receiving device immediately synchronizes to the timeslot with confidence that it is synchronizing to the desired timeslot. The receiving device then decodes the bursts according to known techniques, as above (at step 330).

Figure 4:
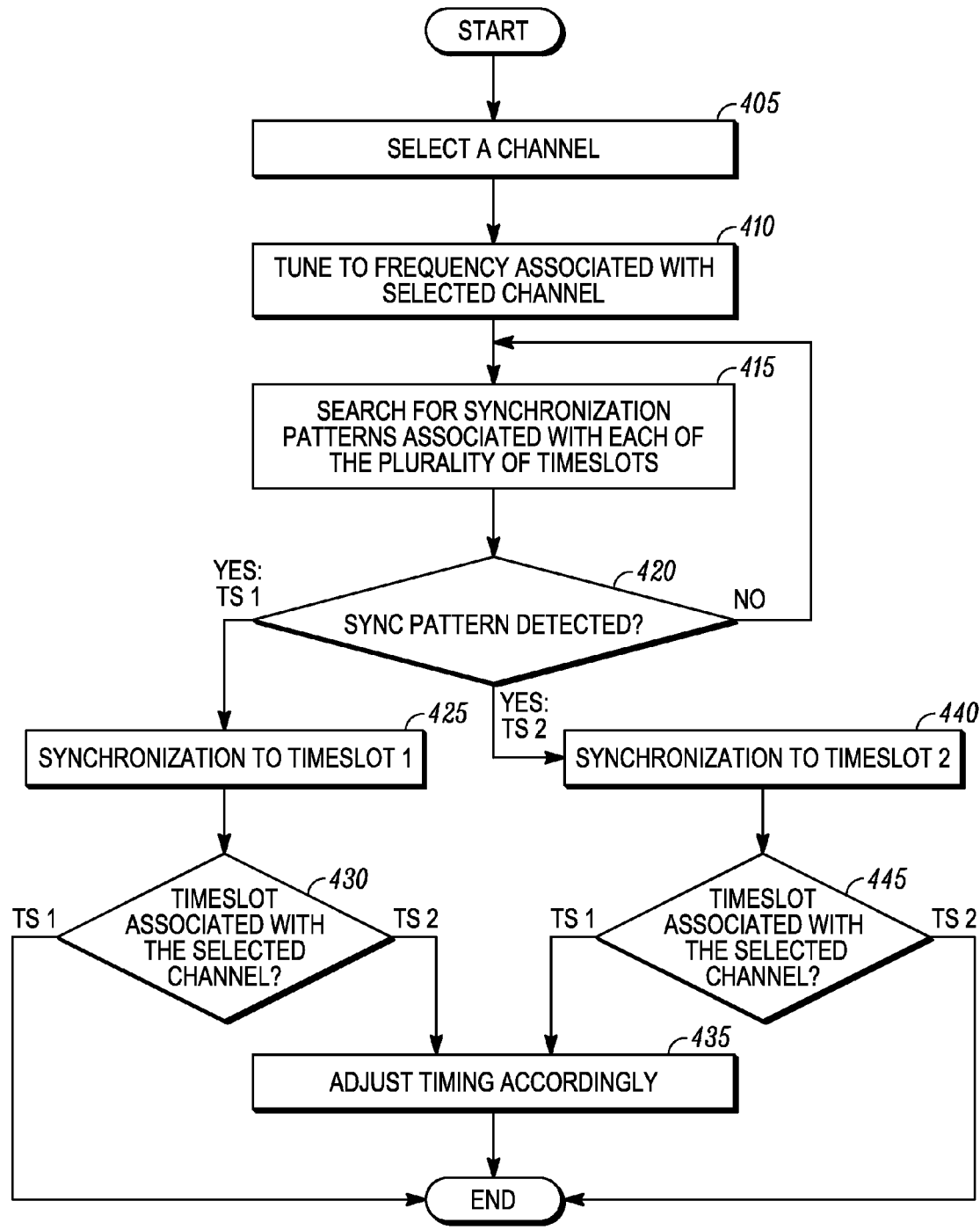
FIG. 4 illustrates a flow diagram of a second exemplary method of how the receiving device efficiently synchronizes to the desired timeslot in accordance with an embodiment of the present disclosure.

In some instances, the transmitting device may only transmit the synchronization pattern for a particular timeslot once every 360 ms (e.g., as in a voice superframe). The superframe structure is commonly known in the art in accordance with the ETSI DMR TS 102 361-1 superframe rules, and will not be discussed in great detail in this disclosure. Thus, if the receiving device does not detect one of the synchronization patterns associated with the desired timeslot, it may have to wait up to another 360 ms before detection can occur. As such, it may be advantageous for the receiving device to synchronize to the desired timeslot using an alternative embodiment as illustrated in FIG. 4. In this embodiment, a channel is selected for the receiving device, and the receiving device tunes to the desired frequency associated with the selected channel (at steps 405 and 410) as described above in FIG. 3 at step 305 and 310. In this embodiment, however, the receiving device begins searching for synchronization patterns associated with each of the plurality of timeslots on the desired frequency (at step 415). In other words, the receiving device searches the desired frequency for one of the synchronization patterns associated with any of the plurality of timeslots (e.g., Timeslot 1 or Timeslot 2), simultaneously, until one of the synchronization patterns is detected (at step 420). Once the receiving device detects one of the synchronization patterns on the desired frequency (at step 420), it determines the timeslot associated with the synchronization pattern that was detected. Thus, if the timeslot associated with the synchronization pattern that was detected is Timeslot 1, the receiving device continues the process flow in the direction of step 425; if the timeslot associated with the synchronization pattern that was detected is Timeslot 2, the receiving device continues the process flow in the direction of step 440.

Once the receiving device synchronizes to the timeslot that is associated with the synchronization pattern that was detected (at step 425 or 440), it compares the timeslot associated with its channel selection with the timeslot that is associated with the synchronization pattern that was detected (i.e., the timeslot that the receiving device is currently synchronized with) (at step 430 or 445). If the timeslots match, the receiving device immediately knows that it has synchronized to the desired timeslot at step 425 or 440, and decodes the desired timeslot according to known techniques. If the timeslots, however, do not match, the receiving device immediately realizes that it synchronized to the incorrect timeslot at step 425 or 440, and adjusts timing accordingly to decode the desired timeslot (at step 435). For example, since, in this embodiment, the transmitting device transmits a burst every 30 ms and the TDMA slotting structure is 2:1, the receiving device adjusts its timing by 30 ms (at step 440) in order to begin decoding the desired timeslot according to known techniques. It should be noted that the timing adjustment needed to decode the desired timeslot, if different than the timeslot in which it is synchronized, may be based on knowledge of the slotting ratio of the TDMA system (i.e., the n in the n:1 slotting structure) and a time duration of each timeslot in the plurality of timeslots. The timing may be further adjusted based on the synchronized timeslot number and the desired timeslot number. If, for example, the TDMA slotting structure was 4:1, the timeslot duration was 20 ms, the synchronized timeslot was timeslot 1 and the desired timeslot was timeslot 4, then a timing adjustment of −20 ms or +60 ms is required to align to the desired timeslot in order to decode the desired timeslot in accordance with known techniques.

Up to this point, the receiving device has known a priori which frequency and timeslot to monitor for detection of the synchronization pattern. Let us now discuss how the receiving device efficiently synchronizes to a desired timeslot when the desired frequency and desired timeslot are not known a priori to the receiving device.

Figure 5:
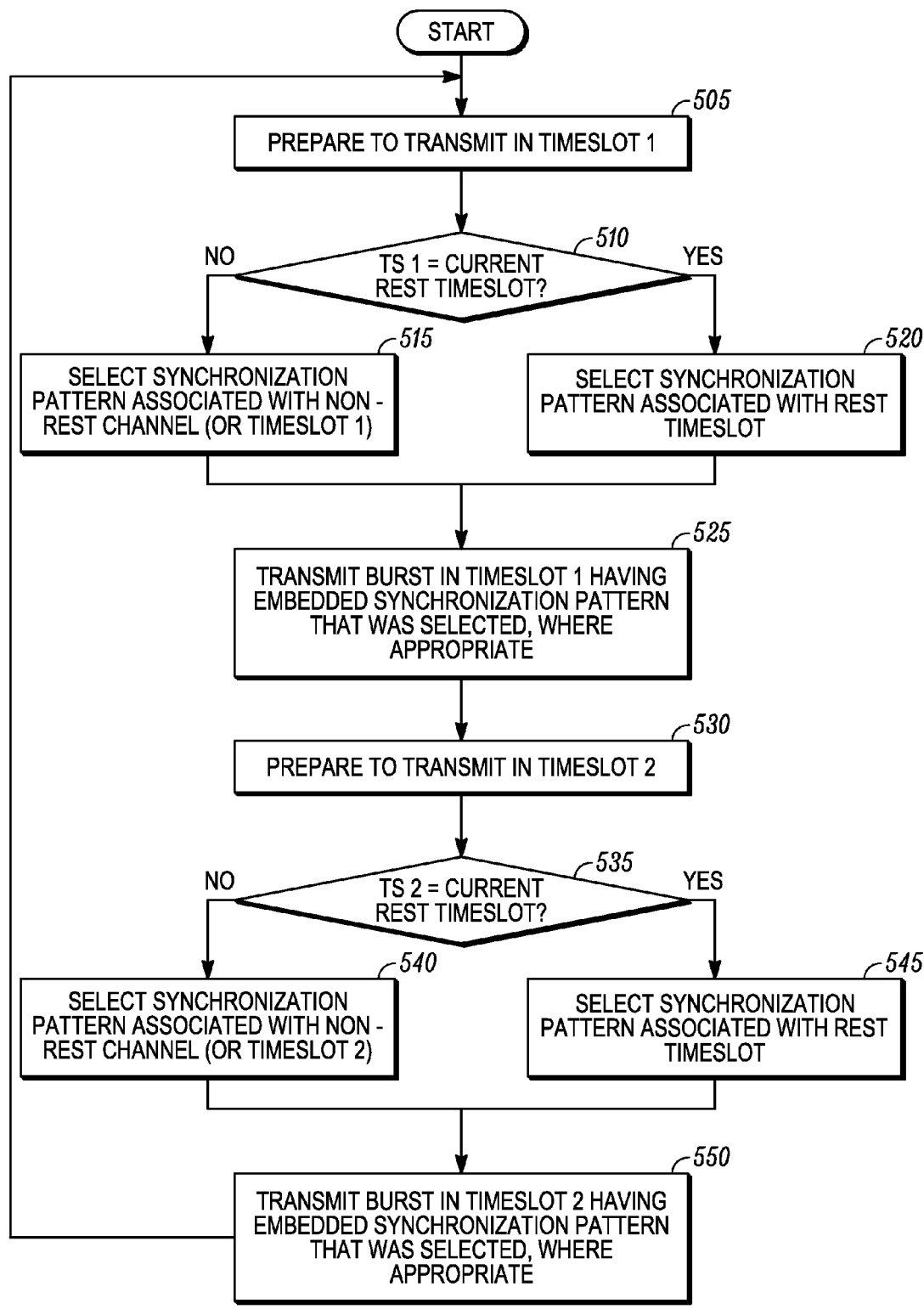
FIG. 5 illustrates a flow diagram of an exemplary method of how a transmitting device transmits bursts using different synchronization patterns associated with a rest timeslot and a non-rest timeslot in accordance with an embodiment of the present disclosure.

FIG. 5 illustrates a flow diagram of an exemplary method of how a transmitting device transmits bursts using different synchronization patterns associated with a rest timeslot and a non-rest timeslot in accordance with an embodiment of the present disclosure. The concept of the rest timeslot (or rest channel) is disclosed in U.S. Ser. No. 12/331,180, titled "Method for Trunking Radio Frequency Resources" and developed by and assigned to Motorola, Inc., which is herein incorporated by reference in its entirety. It is important to note that in this embodiment, the synchronization patterns associated with the current rest timeslot for the system is mutually exclusive from the sets of synchronization patterns associated with each of the other timeslots in the TDMA system (i.e., the non-rest timeslots).

In operation, the transmitting device knows a first set of synchronization patterns associated with the rest timeslot, and a second set of synchronization patterns associated with each of the other timeslots in the TDMA system (i.e., the non-rest timeslots), wherein the first set of synchronization patterns and the second set of synchronization patterns are mutually exclusive. The transmitting device prepares to transmit in Timeslot 1 (at step 505). Once prepared to transmit in Timeslot 1, the transmitting device determines whether Timeslot 1 is the current rest timeslot for the TDMA system (at step 510).

If Timeslot 1 is not the current rest timeslot for the TDMA system, the transmitting device selects a synchronization pattern selected from the second set of synchronization patterns (at step 515). In one embodiment, the second set of synchronization patterns could comprise only one pattern (e.g., Sync_Non_Rest_TS). In another embodiment, the second set of synchronization patterns could comprise synchronization patterns that differentiate between payload-type and source, or the like. Thus, in an example for this embodiment, the transmitting device selects the synchronization pattern based on the payload-type (e.g., voice, data, or control) of Timeslot 1; if the payload-type of Timeslot 1 is data or control, the transmitting device selects a data synchronization pattern (e.g., BS_Sourced_Data=DFF57D75DF5D$_{16}$), and if the payload-type of Timeslot 1 is voice, the transmitting device selects a voice synchronization pattern (e.g., BS_Sourced_Voice=755FD7DF75F7$_{16}$).

Returning back to step 510, if Timeslot 1 is the current rest timeslot for the TDMA system, the transmitting device selects a synchronization pattern selected from the first set of synchronization patterns (at step 520). Again, in one embodiment, the first set of synchronization patterns could comprise only one pattern (e.g., Sync_Rest_TS). In another embodiment, the first set of synchronization patterns could comprise synchronization patterns that differentiate between payload-type and source, or the like. Thus, to continue the example for this embodiment, if the payload-type of Timeslot 1 is data or control, the transmitting device selects a rest timeslot data synchronization pattern (e.g., BS_Sourced_Data_Rest_TS=DD7FF5D757DD$_{16}$); if, however, the payload-type of Timeslot 1 is voice, the transmitting device selects a rest timeslot voice synchronization pattern (e.g., BS_Sourced_Voice_Rest_TS=755D55F7DFD77$_{16}$).

Once the appropriate synchronization pattern is selected for Timeslot 1, the transmitting device transmits the burst in Timeslot 1 having embedded the synchronization pattern that was selected, where appropriate (at step 525), and prepares to transmit in the next timeslot, in this case, Timeslot 2 (at step 530).

Once prepared to transmit in the next timeslot, the transmitting device repeats the process flow of steps 510-525 for Timeslot 2 at steps 530-550, as described above. The process flow is repeated n times in a n:1 slotting structure of a TDMA communication system. It is important to note, that in this embodiment, while the synchronization patterns associated with the rest timeslot remain the same, the frequency and timeslot identified by the system as being the current rest timeslot may change. In other words, there is only one rest timeslot in a given system at any given time. Thus, as frequencies in the system become useable or unusable based on the functioning and/or malfunctioning of a repeater, or as frequencies in the system become usable or unusable based on the detected presence or absence of co-channel users or as timeslots on a frequency in the system become busy and/or idle, the frequency and timeslot identified as the system's current rest timeslot may change dynamically. In other words, the rest timeslot at a first time is different than the rest timeslot from a second time. It is also important to note that the synchronization patterns associated with the rest timeslot are mutually exclusive from the other synchronization patterns associated with the timeslots (i.e., non-rest timeslots) in the TDMA system; the synchronization patterns associated with the non-rest timeslots may or may not be mutually exclusive among each other.

Figure 6:
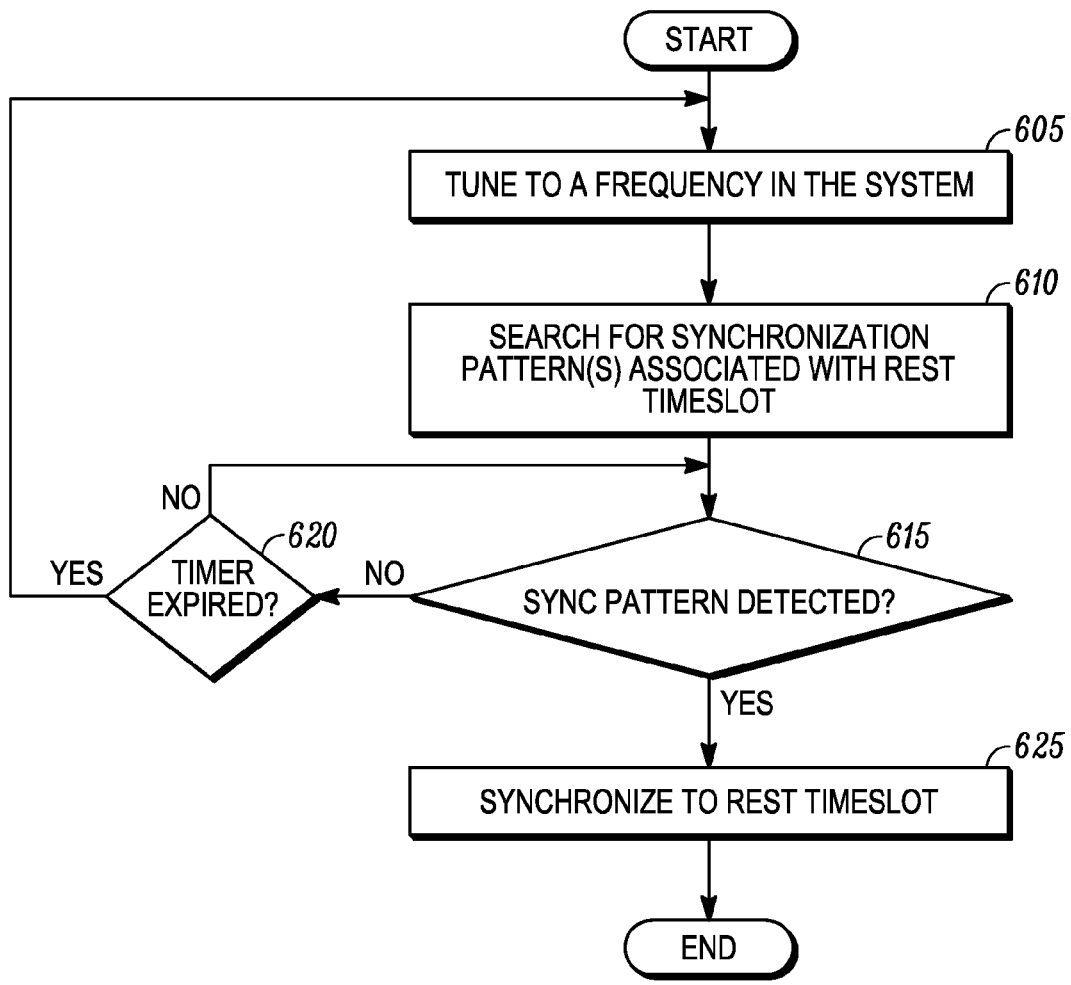
FIG. 6 illustrates a flow diagram of an exemplary method of how the receiving device efficiently synchronizes to the rest timeslot in accordance with an embodiment of the present disclosure.

Moving on, FIG. 6 illustrates a flow diagram of an exemplary method of how the receiving device synchronizes to the rest timeslot in accordance with an embodiment of the present disclosure. In operation, the receiving device tunes to a frequency in the TDMA system (at step 605). The receiving device may determine which frequency to tune to in a number of ways, for example, but not limited to, when the receiving device has a list of candidate rest timeslots, or a list of timeslots in general, and the receiving device sequentially selects frequencies that correspond to the timeslots from the list.

After the receiving device tunes to a frequency, it begins to search for synchronization patterns that the transmitting device associates with the rest timeslot (e.g., BS_Sourced_Data_Rest_TS and BS_Sourced_Voice_Rest_TS; or simply Rest_TS_Sync) (at step 610). The receiving device searches the frequency until it detects one of the synchronization patterns associates with the rest timeslot (at step 615), or until the timer expires (at step 620), whichever is sooner. If the receiving device detects one of the synchronization pattern associated with the rest timeslot on the frequency before the timer expires, the receiving device immediately synchronizes to the timeslot with confidence that it has detected the rest timeslot, since the rest timeslot is the only channel in the system that is transmitting a synchronization pattern associated with the rest timeslot (at step 625). If, however, the receiving device does not detect one of the synchronization patterns associated with the rest timeslot before the timer expires, the receiving device tunes to another frequency in the system (at step 605), and repeats the process flow.

So far, the examples in FIGS. 2 and 5 illustrate a repeater being the transmitting device; the present disclosure, however, is also applicable when the subscriber unit is the transmitting device. In a repeater-based system, when the transmitting device is a subscriber unit that is transmitting to the repeater, the subscriber unit embeds the appropriate synchronization pattern for the appropriate timeslot (e.g., Sync_Pattern_TS1 or Sync_Pattern_TS2), where appropriate, in the bursts transmitted to the repeater. This allows the repeater to verify that the incoming transmission is indeed on the correct timeslot. Additionally, this enables the transmission of a signal to the repeater without requiring the subscriber unit to first synchronize to the downlink (i.e., information flow from the repeater to the subscriber unit) and determine the correct timeslot when the downlink is inactive. The repeater downlink is often inactive to enable a shared usage of the frequency among numerous entities.

Figure 7:
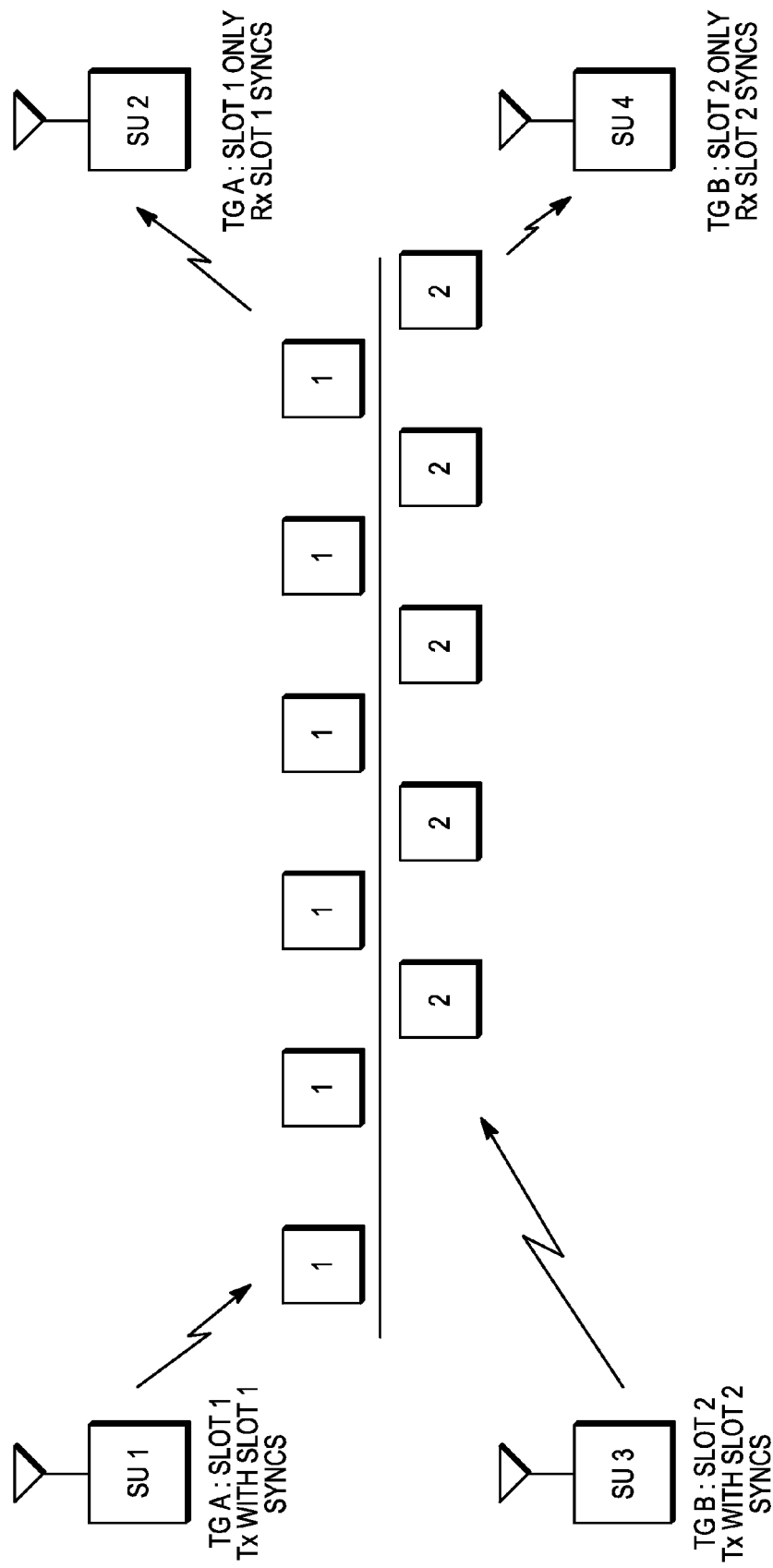
FIG. 7 illustrates a simple timing diagram of two direct-mode transmissions in accordance with an embodiment of the present disclosure.
Figure 8:
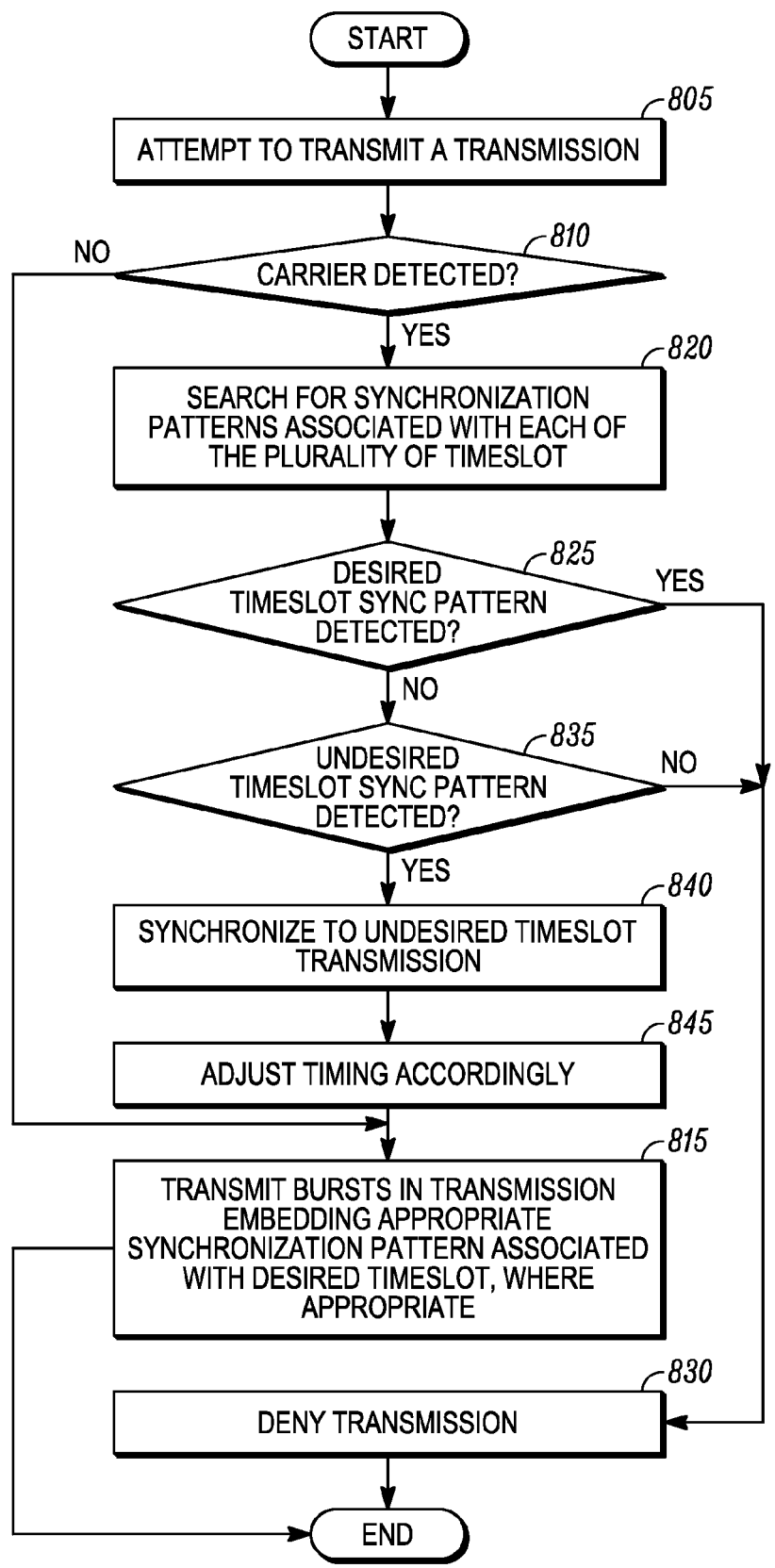
FIG. 8 illustrates a flow diagram of a first exemplary method of how a subscriber unit determines whether it is allowed to transmit a direct-mode transmission in accordance with an embodiment of the present disclosure.

Let us now discuss direct mode transmission in accordance with the present disclosure. During a direct mode transmission, when the transmitting subscriber unit is transmitting directly to a receiving subscriber unit, the transmitting subscriber unit selects an appropriate synchronization pattern associated with the timeslot that it will transmit in, in order to improve spectral efficiency. FIG. 7 illustrates a simple timing diagram of subscriber units communicating directly with one another. As shown, two transmissions are currently being transmitted by two transmitting subscriber units on a single frequency (e.g., 12.5 kHz channel bandwidth with 2:1 TDMA slotting structure for 6.25e spectral efficiency) in separate timeslots. Transmitting subscriber unit 1 is transmitting bursts in its transmission that have an embedded synchronization pattern associated with Timeslot 1, where appropriate; transmitting subscriber unit 3 is transmitting bursts in its transmission that have an embedded synchronization pattern associated with Timeslot 2, where appropriate. Once the synchronization patterns are detected by the receiving subscriber units 2 and 4, respectively, the receiving subscriber units 2 and 4 immediately know they have synchronized to their desired timeslots.

Let us describe direct-mode in greater detail with reference to FIGS. 8, 9, 10 and 11 in accordance with the present disclosure. In general, let us assume that the transmitting subscriber unit knows a priori the frequency and timeslot in which it is assigned (hereinafter referred to as frequency $F_1$ and desired timeslot).

In operation, the transmitting subscriber unit attempts to initiate a transmission on frequency $F_1$ in the desired timeslot (e.g., by activating a push-to-talk (PTT) function, or the like) (at step 805). The transmitting subscriber unit searches for carrier presence on frequency $F_1$ (at step 810). If the transmitting subscriber unit does not detect a carrier presence on frequency $F_1$ (at step 810), it begins to transmit bursts in its transmission embedding the appropriate synchronization pattern associated with the desired timeslot, where appropriate (at step 815). If, however, the transmitting subscriber unit does detect a carrier presence on frequency $F_1$ (at step 810), it begins to search for synchronization patterns associated with each of the plurality of timeslots on the frequency, wherein each of the plurality of timeslots on frequency $F_1$ has a set of synchronization patterns associated therewith, and each set of synchronization patterns are mutually exclusive of each other (at step 820).

If one of the synchronization patterns associated with the desired timeslot is detected on frequency $F_1$ (at step 825), the transmitting subscriber unit denies its transmission (at step 830) because it is assumed that the desired timeslot is busy. If, however, none of the synchronization patterns associated with the desired timeslot are detected on frequency $F_1$ (at step 825), the transmitting subscriber unit determines whether one of the synchronization patterns associated with one of the undesired timeslots is detected on frequency $F_1$ (at step 835).

Thus, if none of the synchronization patterns associated with any of the plurality of timeslots (i.e., desired timeslot and undesired timeslot(s)) are detected (at step 835), the transmitting subscriber unit denies its transmission (at step 830). One of the reasons why the transmitting subscriber unit denies transmission if none of the synchronization patterns associated with any of the timeslots are detected is because it may assume that there is a transmission on the frequency that it cannot detect since it detected a carrier presence on the frequency at step 810. Since the transmitting subscriber unit cannot discern, however, which timeslot is carrying the existing transmission because a synchronization pattern is not detected, it denies its transmission in order to avoid interfering with the existing transmission on the frequency. For example, an analog signal does not transmit a synchronization pattern, but may be transmitting on the frequency.

If, however, none of the synchronization patterns associated with the desired timeslot are detected on frequency $F_1$, but at least one of the synchronization patterns associated with any of the other undesired timeslots is detected (at step 835), the transmitting subscriber unit synchronizes to the timeslot associated with one of the synchronization patterns that was detected (at step 840). Once synchronized, the transmitting subscriber unit adjusts timing (at step 845) in order to transmit bursts from its transmission in the desired timeslot using one of the synchronization patterns associated with the desired timeslot, where appropriate (at step 815). The adjustment in timing allows the transmitting subscriber unit to transmit in the desired timeslot without interfering with the transmission being transmitted in any of the other timeslots on frequency $F_1$ in accordance with one embodiment of the invention. For example, if the undesired timeslot is carrying a voice transmission in accordance with the ETSI DMR TS 102 361-1 superframe rules, the transmitting subscriber unit synchronizes to the undesired timeslot and adjusts its timing by 30 ms, which is the time duration of each burst in the superframe.

For further clarification, let us now describe a specific example with reference to FIGS. 3, 8, 9 and 10. For purposes of the following example, let us assume that each subscriber unit knows a priori the frequency and timeslot in which they are assigned and the talk group in which they are affiliated. Let us also assume that subscriber unit 1 is a transmitting subscriber unit that is assigned to frequency $F_1$, a 12.5 kHz channel bandwidth having a 2:1 TDMA slotting structure, and Timeslot 1, and is affiliated with Talk Group A.

In operation, when subscriber unit 1 attempts to initiate a transmission on frequency $F_1$ in Timeslot 1 (at step 805), it begins to search for carrier presence on frequency $F_1$ (at step 810). In this example, subscriber unit 1 does not detect a carrier presence on frequency $F_1$ (at step 810), so it begins to transmit bursts in its transmission embedding the appropriate synchronization pattern associated with Timeslot 1, where appropriate (at step 815).

Figure 9:
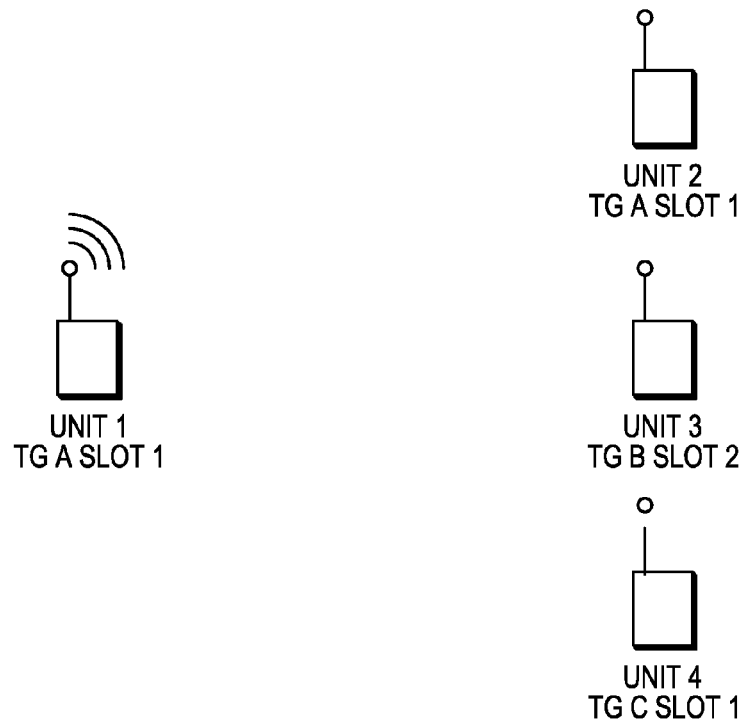
FIG. 9 illustrates a simple block diagram of an example of one subscriber unit transmitting a direct-mode transmission in accordance with the present disclosure.

In this example, as illustrated in FIG. 9, let us now assume subscriber units 1-4 are in communication range of each other. Let us also assume, for this example, that subscriber unit 2 is assigned to frequency $F_1$ and Timeslot 1, and is affiliated with Talk Group A; subscriber unit 3 is assigned to frequency $F_1$ and Timeslot 2, and is affiliated with Talk Group B; and subscriber unit 4 is assigned to frequency $F_1$ and Timeslot 1, and is affiliated with Talk Group C. In operation, subscriber units 2, 3, and 4 select their respective channels (at step 305) and tune to frequency $F_1$ (i.e., the frequency associated with their selected channel) (at step 310). In this example, because subscriber unit 1 is transmitting on frequency $F_1$, subscriber units 2, 3, and 4 detect carrier presence (at step 315). As a result, subscriber units 2, 3, and 4 identify their desired timeslot associated with their respective channel (at step 315), and search frequency $F_1$ for the synchronization patterns associated with their desired timeslot (at step 320 or 335, depending on their assigned timeslot). Searching only for synchronization patterns associated with the desired timeslot prevents the subscriber unit from synchronizing with an undesired timeslot since the synchronization patterns for the timeslots are mutually exclusive (i.e., a subscriber unit assigned to Timeslot 1 on frequency $F_1$ does not incorrectly synchronize with Timeslot 2 on frequency $F_1$, and a subscriber unit assigned to Timeslot 2 on frequency $F_1$ does not incorrectly synchronize with Timeslot 1 on frequency $F_1$).

In this example, subscriber unit 2 detects the synchronization pattern on the frequency (at step 325) and immediately synchronizes to the timeslot with confidence that it has detected its desired timeslot because it detected the synchronization pattern (at step 330). Subscriber unit 2 begins decoding Timeslot 1 according to known techniques. Since the transmission being transmitted in Timeslot 1 by subscriber unit 1 is for Talk Group A, subscriber unit 2 continues to decode and process the transmission in its entirety since subscriber unit 2 is affiliated with Talk Group A.

Subscriber unit 3, however, never detects the synchronization pattern on frequency $F_1$ (at step 340) since its is only searching for synchronization patterns that are associated with Timeslot 2, which are mutually exclusive from the set of synchronization patterns associated with Timeslot 1. As such, subscriber unit 3 does not synchronize with Timeslot 1 (which would have been an undesired timeslot for subscriber unit 3 since it is assigned to Timeslot 2), and continues to search the frequency for one of the synchronization patterns associated with Timeslot 2 (at step 335).

Subscriber unit 4 detects the synchronization pattern on frequency $F_1$ (at step 325), and immediately synchronizes to Timeslot 1 with confidence that it has detected the desired timeslot because it detected the synchronization pattern. Subscriber unit 4 decodes the transmission in accordance with known techniques, however, because subscriber unit 4 is not the intended recipient of the transmission (subscriber unit 4 is not affiliated with Talk Group A), it discards the transmission (i.e., does not render audio to the user). Subscriber unit 4, however, continues to decode transmissions in the timeslot in case a subsequent transmission is received that is intended for Talk Group C.

Let us now add a twist to the example. Let us assume that subscriber unit 3 now wants to become a transmitting subscriber device and attempts to initiate a transmission. Continuing with the example, subscriber unit 3 attempts to initiate a transmission on frequency $F_1$ in Timeslot 2 (at step 805), and begins to search for carrier presence on frequency $F_1$ (at step 810). In this example, subscriber unit 3 detects a carrier presence (i.e., the RF energy from the transmission of subscriber unit 1) (at step 810). As a result, subscriber unit 3 searches for synchronization patterns associated with each of the plurality of timeslots on the frequency (i.e., Timeslot 1 and Timeslot 2), wherein the synchronization patterns associated with Timeslot 1 and the synchronization patterns associated with Timeslot 2 are mutually exclusive (at step 820).

In this example, subscriber unit 3 does not detect any of the synchronization patterns associated with Timeslot 2 on frequency $F_1$ (at step 825), but does detect one of the synchronization patterns associated with Timeslot 1 (at step 835), thus assuming Timeslot 1 is currently busy and Timeslot 2 is currently idle. As a result, subscriber unit 3 synchronizes to Timeslot 1 (at step 840) and adjusts timing (at step 845) in order to transmit bursts from its transmission, embedding the appropriate synchronization pattern associated with Timeslot 2, where appropriate, in Timeslot 2 without interfering with the transmission being transmitted in Timeslot 1 (at step 815). Thus, since subscriber unit 1 is transmitting a direct-mode transmission in Timeslot 1 and subscriber unit 3 is transmitting a direct-mode transmission in Timeslot 2, simultaneously, on a 12.5 kHz channel bandwidth having a 2:1 TDMA slotting structure, 6.25e spectral efficiency is achieved, and a significant portion of the channel bandwidth is no longer unnecessarily left unoccupied.

Figure 10:
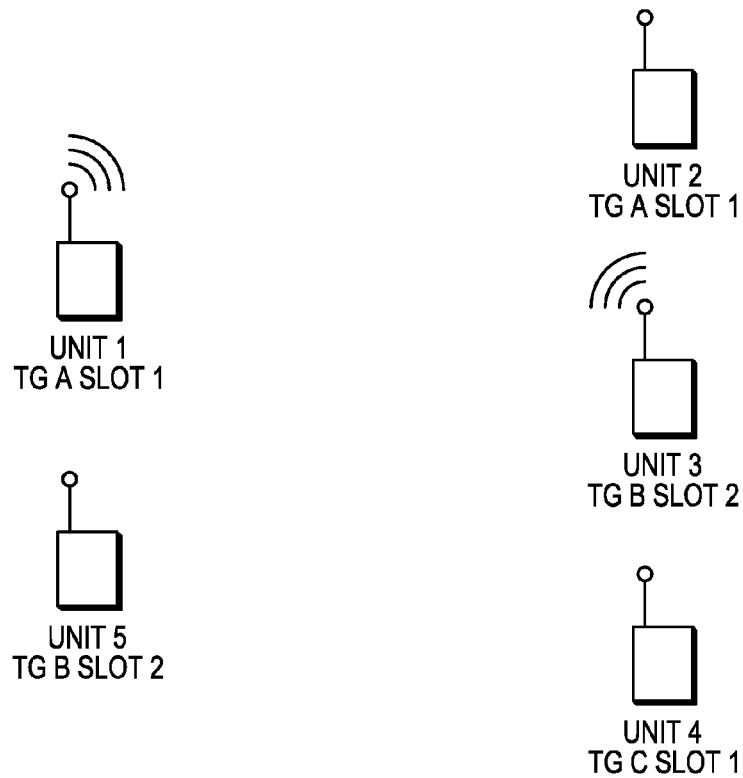
FIG. 10 illustrates a simple block diagram of an example of two subscriber units transmitting a direct-mode transmission on the same frequency in different timeslots in accordance with the present disclosure.

Referring now to FIG. 10, let us finally assume that subscriber unit 5 has moved into communication range of subscriber units 1-4. Let us also assume that subscriber unit 5 is assigned to frequency $F_1$ and Timeslot 2, and is affiliated with Talk Group B. Subscriber unit 5 selects its respective channel (at step 305) and tunes to the frequency associated with its selected channel (at step 310). In this example, subscriber unit 5 detects carrier presence on frequency $F_1$ (at step 315). Subscriber unit 5 identifies its desired timeslot associated with their respective channel (at step 320), and searches the frequency for the synchronization patterns associated with its desired timeslot, Timeslot 2 (at step 335). In this example, subscriber unit 5 detects the synchronization pattern on the frequency, and as a result, synchronizes to Timeslot 2. Even though there is a transmission being transmitted in Timeslot 1 and in Timeslot 2, subscriber unit 5 immediately knows that it has detected and is synchronized to the desired timeslot because it detected the synchronization pattern, and thus begins decoding Timeslot 2 according to known techniques. Since the transmission being transmitted in Timeslot 2 by subscriber 3 is for Talk Group B, subscriber unit 5 continues to decode the transmission in its entirety since subscriber unit 5 is affiliated with Talk Group B.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. For example, the receiving device may optionally search for carrier (energy) presence on the frequency prior to searching for synchronization patterns(s) (at steps 320, 335, 415, or 610). If the optional feature is implemented, the receiving device searches for carrier presence on the frequency, until detected. If carrier presence is detected, the receiving device begins searching for synchronization pattern(s) as described in the respective flow diagrams and the above descriptions. An advantage of this optional feature is that it preserves the battery life of the receiving device since it is not searching for synchronization patterns on an idle channel. In other words, the carrier (energy) detection process typically requires less millions of instructions per second (MIPS) than a correlation process used for detecting a data pattern, such as synchronization patterns; higher MIPS translates to higher current drain on the battery. Also, there may be an optional first search timer implemented in the system that monitors how long the receiving device continues to search for carrier presence on a particular frequency before it selects a different channel. Thus, the receiving device searches for carrier presence on the frequency, until detected, or until the optional first search timer expires, whichever is sooner. If the optional first search timer expires before a carrier presence is detected, the receiving device returns to the beginning of the respective process flow and starts the process over. This optional first search timer is commonly implemented when the user of the receiving device activates a scan feature and the receiving device sequentially selects channels from a scan list (also known as the conventional scan method). In addition, an optional second search timer may be implemented. When the receiving device begins searching for the synchronization patterns, the optional second search timer may be implemented that expires after a predetermined amount of time has elapsed. Thus, the receiving device continues to search the frequency until it detects one of the synchronization patterns, or until the optional second search timer expires, whichever is sooner. If the optional second search timer expires before one of the synchronization patterns is detected, the receiving device returns to the beginning of the process flow and starts the process over.

As such, the present disclosure discloses, in a TDMA system having a plurality of timeslots, a method comprising the steps of: tuning to a frequency in the system; searching for a desired set of synchronization patterns on the frequency, wherein the desired set of synchronization patterns is mutually exclusive of other synchronization patterns used in the system; and if one of the synchronization patterns belonging to the desired set of synchronization patterns is detected on the frequency, synchronizing to a timeslot in which the synchronization pattern was detected.

The present disclosure also discloses, in a TDMA system having a plurality of timeslots, a method comprises the steps of: knowing a first set of synchronization patterns associated with a desired timeslot and a second set of synchronization patterns associated with each of the other timeslots in the TDMA system, wherein the first set of synchronization patterns is mutually exclusive from the second set of synchronization patterns; preparing to transmit in a timeslot; determining whether the timeslot is a current desired timeslot; and if the timeslot is the current desired timeslot, selecting a synchronization pattern selected from the first set of synchronization patterns; otherwise selecting a synchronization pattern selected from the second set of synchronization patterns; and transmitting a burst in the timeslot having embedded the synchronization pattern that was selected.

The present disclosure further discloses, in a TDMA system having a plurality of timeslots, a method comprising the steps of: selecting a channel having a desired frequency and a desired timeslot, wherein each timeslot has a set of synchronization patterns associated therewith; tuning to the desired frequency; searching for synchronization patterns associated with the desired timeslot on the desired frequency, wherein the set of synchronization patterns associated with the desired timeslot is mutually exclusive of sets of synchronization patterns associated with any of the other timeslots on the desired frequency; and if one of the synchronization patterns associated with the desired timeslot is detected on the desired frequency, synchronizing to the desired timeslot.

Still yet, the present disclosure discloses, in a TDMA system having a plurality of timeslots, a method comprising the steps of: selecting a channel having a desired frequency and a desired timeslot, wherein each timeslot has a set of synchronization patterns associated therewith, and each set of synchronization patterns are mutually exclusive of each other; tuning to the desired frequency; searching for synchronization patterns associated with each of the plurality of timeslots on the desired frequency; if one of the synchronization patterns is detected on the desired frequency, synchronizing to a timeslot that is associated with the synchronization pattern that was detected; and if the desired timeslot does not match the timeslot that is associated with the synchronization pattern that was detected, adjusting timing to decode the desired timeslot.

The present disclosure also discloses, in a TDMA system having a plurality of timeslots, a method comprising the steps of: attempting to initiate a transmission on a desired frequency and a desired timeslot; detecting a carrier presence on the desired frequency; searching for synchronization patterns associated with each of the plurality of timeslots on the desired frequency, wherein each of the plurality of timeslots on the desired frequency has a set of synchronization patterns associated therewith, and each set of synchronization patterns are mutually exclusive of each other; if one of the synchronization patterns associated with the desired timeslot is detected on the desired frequency, denying the transmission; if none of the synchronization patterns associated with any of the plurality of timeslots are detected on the desired frequency, denying the transmission; and if none of the synchronization patterns associated with the desired timeslot are detected on the desired frequency, but at least one of the synchronization patterns associated with any of the other timeslots is detected on the desired frequency, synchronizing to a timeslot associated with one of the synchronization patterns that was detected, and adjusting timing in order to transmit the transmission in the desired timeslot using one of the synchronization patterns associated with the desired timeslot.

The present disclosure further discloses, in a TDMA system having a plurality of timeslots, a method comprising the steps of: knowing a set of synchronization patterns associated with each timeslot on a frequency, wherein each set of synchronization patterns associated with each timeslot on the frequency are mutually exclusive of each other; preparing to transmit in a timeslot; selecting a synchronization pattern associated with the timeslot; and transmitting a burst having embedded the synchronization pattern that was selected.

The apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The invention is defined solely by the appended claims including any amendments made during the pendency of this application and all equivalents of those claims as issued.

We claim:

1. In a time division multiple access (TDMA) system having a plurality of timeslots, a method comprising the steps of:
   tuning to a frequency in the system;
   searching for a desired set of synchronization patterns on the frequency, each of at least two slots on the frequency out of n slots used on the frequency having a set of synchronization patterns that are mutually exclusive of each other and of other sets of synchronization patterns used in the system on the frequency, and each set comprising at least two different synchronization patterns as a function of a payload type; and
   if one of the synchronization patterns belonging to the desired set of synchronization patterns is detected on the frequency, synchronizing to a timeslot in which the synchronization pattern was detected and receiving information corresponding to the indicated payload type.

2. The method of claim 1 wherein the TDMA system has a slotting ratio that is n:1, and n is an integer greater than 1.

3. The method of claim 1, each set of synchronization patterns further comprising different synchronization patterns as a function of a source of the transmission.

4. The method of claim 3, wherein the source of the transmission is one of a subscriber station and a repeater station.

5. The method of claim 1, wherein the payload type is one of voice, data, and control.

6. The method of claim 1, each mutually exclusive set of synchronization patterns further comprising at least a third synchronization pattern mutually exclusive of other synchronization patterns in the set for identifying a slot as a rest slot, the method further comprising detecting the third synchronization pattern and synchronizing to the indicated rest timeslot.

7. In a time division multiple access (TDMA) system having a plurality of timeslots, a method comprises the steps of:
   knowing a first set of synchronization patterns associated with a desired timeslot and a second set of synchronization patterns associated with each of the other timeslots in the TDMA system, wherein the first set of synchronization patterns is mutually exclusive from the second set of synchronization patterns, and each set comprising at least two different synchronization patterns as a function of at least one of a payload type and a source of the transmission;
   preparing to transmit a particular payload type in a timeslot;
   determining whether the timeslot is a current desired timeslot for the TDMA system;
   if the timeslot is the current desired timeslot, selecting a synchronization pattern selected from the first set of synchronization patterns based on the one of the particular payload type and a particular source of the transmission; otherwise selecting a synchronization pattern selected from the second set of synchronization patterns based on the one of the particular payload type and the particular source of the transmission; and
   transmitting a burst in the timeslot having embedded the synchronization pattern that was selected.

8. The method of claim 7 wherein the current desired timeslot at a first time is different than the current desired timeslot at a second time.

9. The method of claim 7 wherein the other timeslots each have a set of synchronization patterns associated therewith, and each set of synchronization patterns are mutually exclusive of each other.

10. The method of claim 7, further comprising the steps of:
    knowing a set of synchronization patterns associated with a rest timeslot that is mutually exclusive from all of the sets of synchronization patterns in the system;
    determining whether the timeslot is a rest timeslot prior to the step of selecting; and
    if the timeslot is the rest timeslot, selecting a synchronization pattern associated with the rest timeslot.

11. The method of claim 10, wherein the current desired timeslot is a rest timeslot, and the selected synchronization pattern comprises the rest synchronization pattern.

12. In a time division multiple access (TDMA) system having a plurality of timeslots, a method comprising the steps of:
    selecting a channel having a desired frequency and a desired timeslot, wherein each timeslot has a set of synchronization patterns associated therewith, each set of synchronization patterns are mutually exclusive of each other, and each set of synchronization patterns comprises at least two different synchronization patterns as a function of at least one of a payload type and a source of the transmission;
    tuning to the desired frequency;
    searching for synchronization patterns associated with each of the plurality of timeslots on the desired frequency;
    if one of the synchronization patterns is detected on the desired frequency, synchronizing to a timeslot that is associated with the synchronization pattern that was detected; and
    if the desired timeslot does not match the timeslot that is associated with the synchronization pattern that was detected, adjusting timing to decode the desired timeslot.

13. The method of claim 12 furthering comprises the step of detecting a carrier presence on the desired frequency prior to the step of searching.

14. The method of claim 12 wherein the TDMA system has a slotting ratio that is n:1, and n is an integer greater than 1, and wherein the timing is further adjusted based on the slotting ratio of the TDMA system and a time duration of each timeslot in the plurality of timeslots.

15. The method of claim 12, wherein the payload type is one of voice and data, and the source of the transmission is one of subscriber station and repeater.

16. In a time division multiple access (TDMA) system having a plurality of timeslots, a method of attempting to initiate a transmission on a desired frequency and a desired timeslot, the method comprising the steps of:
    detecting a carrier presence on the desired frequency;
    searching for synchronization patterns associated with each of the plurality of timeslots on the desired frequency, wherein each of the plurality of timeslots on the desired frequency has a set of synchronization patterns associated therewith, and each set of synchronization patterns are mutually exclusive of each other;
    if one of the synchronization patterns associated with the desired timeslot is detected on the desired frequency, denying the transmission;
    if none of the synchronization patterns associated with any of the plurality of timeslots are detected on the desired frequency, denying the transmission; and
    if none of the synchronization patterns associated with the desired timeslot are detected on the desired frequency, but at least one of the synchronization patterns associated with any of the other timeslots is detected on the desired frequency, synchronizing to a timeslot associated with one of the synchronization patterns that was detected, and adjusting timing in order to transmit the transmission in the desired timeslot using one of the synchronization patterns associated with the desired timeslot.

17. The method of claim 16 wherein the TDMA system has a slotting ratio that is n:1, and n is an integer greater than 1, and wherein the timing is further adjusted based on the slotting ratio of the TDMA system and a time duration of each timeslot in the plurality of time slots.

18. The method of claim 16 wherein the TDMA system has a slotting ratio that is n:1, and n is an integer greater than 1.

19. The method of claim 16, wherein the TDMA system is a direct mode communication system having a plurality of time slots for direct communications between two subscriber radios, the method further comprising the step of transmitting a burst directly from one subscriber station to another subscriber station.

20. The method of claim 16, each set of synchronization patterns comprising at least two different synchronization patterns as a function of at least one of a payload type and a source of the transmission.

21. The method of claim 20, wherein the payload type is one of voice and data, and the source of the transmission is one of subscriber station and repeater.

* * * * *

UNITED STATES PATENT AND TRADEMARK OFFICE
CERTIFICATE OF CORRECTION

| | | |
|---|---|---|
| PATENT NO. | : 8,279,991 B2 | Page 1 of 1 |
| APPLICATION NO. | : 12/331189 | |
| DATED | : October 2, 2012 | |
| INVENTOR(S) | : Wiatrowski et al. | |

It is certified that error appears in the above-identified patent and that said Letters Patent is hereby corrected as shown below:

In Fig. 1, Sheet 1 of 9, insert -- 100 --, above figure 1.

In Column 5, Line 61, delete "$D_{16}$)" and insert -- $D_{16}$). --, therefor.

In Column 13, Line 33, delete "its" and insert -- it --, therefor.

In Column 18, Line 35, in Claim 13, delete "furthering" and insert -- further --, therefor.

Signed and Sealed this
Fifth Day of February, 2013

Teresa Stanek Rea
*Acting Director of the United States Patent and Trademark Office*